United States Patent
Zotter et al.

(10) Patent No.: US 7,468,132 B2
(45) Date of Patent: Dec. 23, 2008

(54) METHOD FOR TREATMENT OF ANIMAL WASTE

(75) Inventors: Jay William Zotter, Macungie, PA (US); Jason David Wert, Centre Hall, PA (US); Christopher Anthony Quentin Harvey, Macungie, PA (US)

(73) Assignees: Air Products and Chemicals, Inc., Allentown, PA (US); Herbert, Rowland & Grubic, Inc., State College, PA (US)

( * ) Notice: Subject to any disclaimer, the term of this patent is extended or adjusted under 35 U.S.C. 154(b) by 80 days.

(21) Appl. No.: 11/585,572

(22) Filed: Oct. 24, 2006

(65) Prior Publication Data

US 2008/0093292 A1    Apr. 24, 2008

(51) Int. Cl.
  *C02F 3/00*    (2006.01)
(52) U.S. Cl. .................. 210/603; 210/609; 210/605; 210/748
(58) Field of Classification Search .............. 210/603, 210/605, 748, 609
See application file for complete search history.

(56) References Cited

U.S. PATENT DOCUMENTS

| | | | |
|---|---|---|---|
| 2006/0060525 A1* | 3/2006 | Hoffland | 210/603 |
| 2006/0130546 A1* | 6/2006 | Beaton et al. | 71/24 |
| 2006/0231488 A1* | 10/2006 | McCune-Sanders | 210/603 |

\* cited by examiner

*Primary Examiner*—Chester T Barry
(74) *Attorney, Agent, or Firm*—Keith D. Gourley

(57) ABSTRACT

A method and a facility for the treatment of waste from concentrated animal feed operations are disclosed. The method includes receiving manure at a central location, digesting the manure and producing therefrom combustible gases, solid matter and water containing dissolved organic pollutants. The combustible gases are used to provide energy and the water is separated from the solid matter. The solid matter is dried to produce a useful bedding material and the water is treated using an activated sludge aeration system to reduce the dissolved organic pollutants to carbon dioxide, bacteria and water. The facility includes various means for executing the method and includes an ultrasonic treatment station for disrupting bacteria cell walls to improve digestion efficiency.

11 Claims, 2 Drawing Sheets

METHOD FOR TREATMENT OF ANIMAL WASTE

BACKGROUND OF THE INVENTION

This invention relates to a method and a facility for the treatment of animal waste from a plurality of concentrated animal feed operations.

Concentrated Animal Feed Operations (CAFOs), for example, dairy farms, are recognized as a major source of water pollution world wide. The volume of waste matter produced by these operations is significant. Even a modestly sized agricultural community having about 25,000 head of dairy animals distributed over a number of individual operations produces on the order of 200 tons of liquid manure per day. The manure from these operations contains high concentrations of nitrogen and phosphorous. When released into the environment, these nutrient pollutants cause algal blooming in lakes and rivers and contaminate groundwater with nitrates, rendering the water unfit for human consumption.

CAFOs have limited options for disposing of the manure. Because CAFOs typically operate at low profit margins, the most common method of manure disposal is also the least expensive method, namely, the discharge of untreated manure onto farm fields where a portion of the nutrients may be treated by bacteria in the soil or taken up by plants. However, there are limits to the amount of manure and the rate at which the manure can be processed by this method. Large amounts of pollutants from untreated manure are washed off the fields by rain water where they infiltrate through the ground into the groundwater as well as enter streams, lakes and rivers of the surrounding watershed.

Another option is the anaerobic digestion of manure on site at each operation. Although costly in terms of capital expenditure and operational requirements, this method provides for the production of heat and electricity for use by the farm as compensation. However, the anaerobic digestion process yields water soluble nutrients (nitrogen and phosphorous) as a waste product. This waste product is discharged onto the farm fields. Being water soluble, the pollutants are readily dissolved and carried away in water runoff or infiltrate into the groundwater before they can be treated by bacteria or plants. This results in even higher concentrations of pollutants entering the groundwater and the watershed more rapidly than if untreated manure were applied.

There is clearly a need for a method and a facility for treating animal waste for CAFOs that is both economically viable and effective at reducing or eliminating the pollutants released into the environment.

BRIEF SUMMARY OF THE INVENTION

The invention concerns a method of treating manure from a plurality of concentrated animal feed operations. One embodiment of the method comprises:
(a) receiving the manure at a central location;
(b) digesting the manure and thereby producing combustible gases, solid matter and water containing dissolved organic pollutants;
(c) drawing off the combustible gases;
(d) separating a portion of the water from the solid matter; and
(e) converting the dissolved organic pollutants into bacteria, carbon dioxide and additional water by treating the portion of the water using an activated sludge aeration system.

The combustible gases derived from the digestion process may be used to generate energy which can be sold or used to run the various components of the treatment facility. The water separated from the solid matter may be clarified, and the solids removed therefrom are cycled back into the digester.

It is also advantageous to treat the manure with ultrasonic sound waves prior to digesting, allowing the sound waves to disrupt cell walls of bacteria in the manure and thereby increase combustible gas production.

An addition step in the method comprises separating a portion of the water containing dissolved organic pollutants from the manure prior to digesting in order to decrease the volume of matter flowing through the digester apparatus, thereby allowing a smaller digester to be used. The water separated from the solid matter may be clarified, and the solids removed therefrom are cycled back into the digester. The dissolved organic pollutants in this second portion of water may also be converted into bacteria, carbon dioxide and additional water by treating the water with the aforementioned activated sludge aeration system. The water is filtered to remove the bacteria. The solid matter as well as the bacteria may be dried and made available for sale as in the form of products such as bedding material and potting soil.

Additionally, the method may include receiving bacteria laden solid matter from a plurality of waste water treatment facilities and drying the bacteria laden solid matter.

The invention also encompasses a bedding material derived from the treatment method. The bedding material comprises solid matter containing disrupted bacteria cells. The solid matter is derived from manure by:
(a) treating the manure with ultrasonic sound waves prior to the digesting, the sound waves disrupting cell walls of bacteria in the manure;
(b) digesting the manure and thereby producing combustible gases, solid matter and water containing dissolved organic pollutants;
(c) drawing off the combustible gases;
(d) separating a portion of the water from the solid matter; and
(e) drying the solid matter.

Also contemplated is a facility for treating manure for a plurality of concentrated animal feed operations. The facility comprises means for receiving the manure as well as means for digesting the manure. Combustible gases, solid matter and water containing dissolved organic pollutants are the by-products of the digestion process. The facility also includes means for separating a portion of the water from the solid matter as well as means for drying the solid matter. The water contains dissolved organic pollutants which are converted into bacteria, carbon dioxide and additional water by a means, such as an activated sludge aeration system. The bacteria are filtered from the water by a filtering means. Further components of the system may include a means for separating a second portion of water from the manure prior to digesting the manure, a means for treating the manure with ultrasonic sound waves prior to digesting the manure and a means for generating energy from the combustible gases derived from the digestion process.

DETAILED DESCRIPTION OF THE INVENTION

Figure 1:
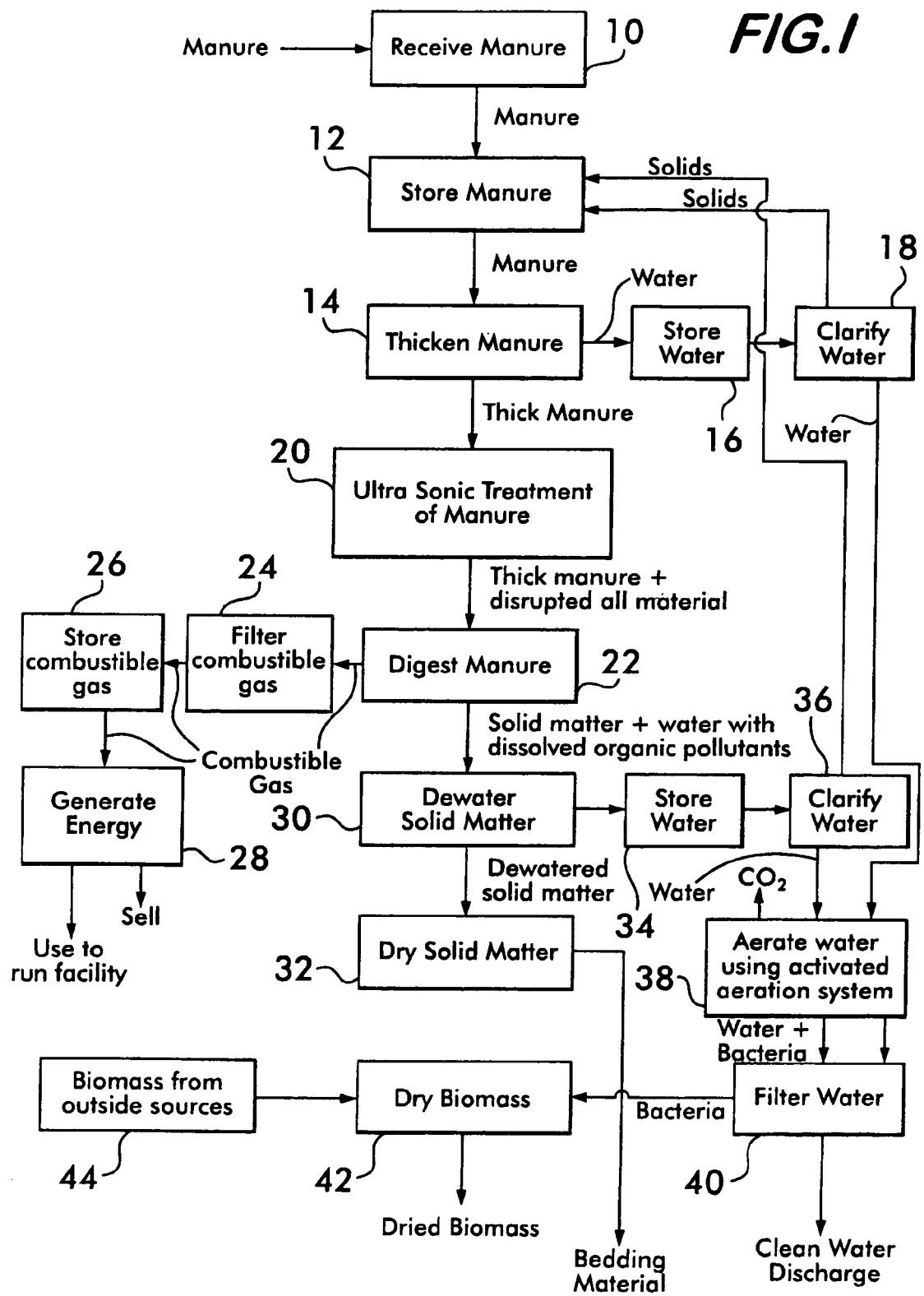
FIG. 1 is a flow chart showing the various steps of a method for CAFO waste treatment according to the invention.

FIG. 1 presents a flow diagram illustrating an embodiment of the method according to the invention for treating animal waste from a plurality of concentrated animal feed operations (CAFOs). Liquid manure is received (box 10) from the various CAFOs and pumped to a storage tank where it is stored temporarily (12). Storage of the manure post delivery is advantageous because it allows the flow rate of manure through the treatment facility to be controlled and remain substantially constant despite variations in the delivery of manure from the various feed operations. The manure is then thickened (14) by removing water, the water being temporarily stored (16) and then clarified (18). Solids separated during the clarification step are returned to the manure storage tank and the water from the clarification step is sent for further treatment, described below.

The thickened manure is subjected to an ultrasonic treatment (20) wherein sound waves are used to disrupt the cell walls of bacteria resident in the manure. Both the thickening step (14) and the ultrasonic treatment (20) are pretreatment steps for the anaerobic digestion step (22) which follows. The anaerobic digestion of the manure yields various gas by-products including combustible gases such as methane. Thickening of the manure allows a physically smaller anaerobic digestion vessel to be used, and the ultrasonic treatment increases the yield of methane from the manure. The methane gas is filtered (24) to remove particulates, water vapor, and unwanted gas by-products such as carbon dioxide and hydrogen sulfide, and the methane gas is stored (26) and used to generate energy (28). A portion of the energy is used to run the treatment facility, while another portion may be sold to consumers or to a utility company.

In addition to combustible gas, the anaerobic digestion step (22) yields stabilized solid matter and water with dissolved organic pollutants such as nitrogen and phosphorous. The solid matter is dewatered (30) and then dried (32) to remove biologic and pathogenic materials. The dried solid matter may be sold as bedding, compost, soil amendments, and potting soil to cite a few examples.

Water removed during the dewatering step (30) is temporarily stored (34) and then clarified (36). Solids from the clarification step are returned to the manure storage tank and the water separated during dewatering (30) and clarification (36) along with the water clarified (18) after the thickening step (14) is aerated (38) using an activated sludge aeration system. In this aeration step, oxygen and bacteria are mixed with the water, and the bacteria convert the dissolved organic pollutants as well as nitrogen and phosphorous into more bacteria, carbon dioxide, nitrogen gas, water and other products. The nitrogen gas and carbon dioxide are discharged to the atmosphere, and water from the aerator is filtered (40) to remove the bacteria. The filtered water complies with the highest standards of applicable environmental regulations and may be used in cold water fisheries, wetlands rehabilitation and stream flow augmentation to cite various examples.

A portion of the bacteria separated from the water is dried (42), thereby removing it from the bacteria population of the activated sludge aeration system to maintain a desired average age of the population. Additional biomass is also received (44) from outside sources such as municipal waste water treatment plants. This additional biomass is also dried (42). The dried biomass is free of pathogens and complies with EPA regulations for a Class A biosolid.

Figure 2:
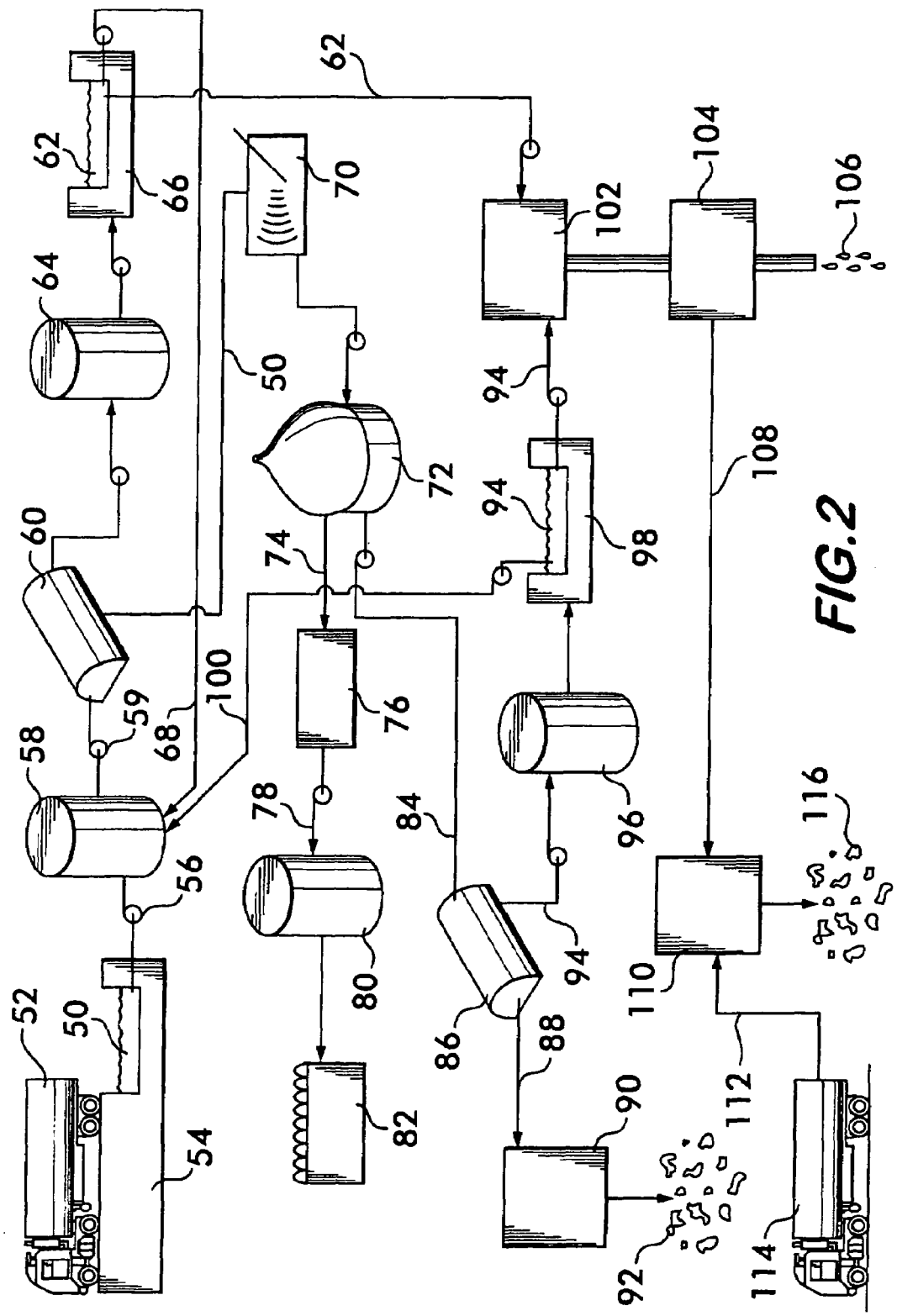
FIG. 2 is a schematic diagram illustrating a facility for CAFO waste treatment according to the invention.

FIG. 2 shows a schematic diagram of an example animal waste treatment facility for treating liquid manure from a plurality of CAFOs according to the invention. Liquid manure 50, collected from various feed operations, is delivered in trucks 52 to a receiving station 54, which may comprise, for example, a concrete trough within an odor containment building into which the trucks can readily tip their loads, thereby facilitating rapid offloading of the manure. After offloading the trucks are sanitized using a chlorine solution to prevent possible cross contamination of farms by the trucks. The used sanitizing solution is collected and treated at the facility. In the example provided, the receiving station is sized to receive up to 360,000 gallons of manure over a 12 hour shift, compatible with the output of 14,000 head of dairy animals.

Pumps 56 move the liquid manure to one or more storage tanks 58, each tank typically comprising a concrete structure with a cover and odor treatment apparatus. As noted above, storage of the manure after its delivery is advantageous because it allows the flow of manure through the facility to be regulated and held substantially constant for efficient, continuous operation.

Pumps 59 move the liquid manure from the storage tanks to a thickening station 60 where water is removed. Centrifuges are a preferred means for thickening the manure, but settling basins, belt presses and filter presses are also feasible. The manure is thickened from about 7% total solids to about 10% total solids. Water 62 separated during thickening is pumped to a storage tank 64 from which it is fed to a clarifying station 66. Clarifying means include settling basins as well as dissolved air flotation. Solid matter 68 separated at the clarifying station is returned to the manure storage tank 58, and the clarified water is pumped to an activated sludge aeration unit described below.

Thickened manure 50 from the thickening station 60 is conveyed to an ultrasonic treatment unit 70 where the manure is subjected to ultrasonic waves tuned to disrupt the cell walls of bacteria in the manure. The manure 50, thickened and ultrasonically treated, is then conveyed to an anaerobic digester 72. The anaerobic digester produces gas by-products, such as carbon dioxide, hydrogen sulfide and methane, as well as stabilized solid matter that remains after digestion. Various means for anaerobic digestion are feasible, including the egg-shaped digester, the plug flow digester and the anaerobic lagoon. Egg-shaped digesters are advantageous because they produce more methane gas per unit of manure than other anaerobic digester means. The ultrasonic pretreatment of the manure further enhances the methane yield. An egg-shaped digester used in the example facility presented herein may have a capacity of 1.2 million gallons and a hydraulic residence time of between 9 and 12 days. The size of the digester required is reduced by the operation of the thickening station 60 which removes a significant volume of water from the manure prior to entry into the digester.

The gas by-products 74 from the digester are conveyed to a gas treatment unit 76 for removal of the undesired gases such as carbon dioxide, water vapor and hydrogen sulfide. Gas treatment means include gravel and ceramic filters, condensate traps and flame traps. Methane gas 78 separated in the gas treatment unit is stored in a tank 80 from which it is supplied to an energy generating station 82. Energy generating means operating in the station include combustion engine generator sets that burn the methane to produce electricity. The electricity is used to light the facility and operate the various pumps and other equipment of the facility. Excess electricity may be sold to a utility company, and waste heat from the engines is captured using heat exchangers. The waste heat may be used to heat the facility, used as process heat or sold locally. In the example facility, an expected yield of approximately one million cubic feet of methane per day will be used to run three 800 kilowatt generators producing 2.2 megawatts of electricity. The generators also produce 19,000 standard cubic feet per minute of exhaust gas at 840 degrees F. The exhaust gas may be used in dryers described below.

Wet solid matter 84 from the digester 72 is conveyed to another dewatering station 86 where centrifuges reduce the water content to about 22% total solids. The example system is expected to produce about 120 wet tons of dewatered solid matter per day. The dewatered solid matter 88 is conveyed to a drying station 90 that employs two direct solid dryers each having a capacity of 100 wet tons per day. Each dryer comprises a conveyor heated by forced air using the 840 degree F. exhaust gases from the engine generator units of the energy generating station 82 to achieve dryer temperatures between 300 and 400 degrees F., thereby removing biological and pathogenic materials from the solid matter 88 consistent with Class A biosolids. Drying times on the order of 45 minutes are expected, and an output of about 70 cubic yards of bedding material 92 should be realized. Note that bedding material 92 comprises solid matter containing disrupted bacteria cells resulting from the action of the ultrasonic treatment unit 70.

Water 94 removed at the dewatering station 86 is pumped to a storage tank 96 from which it is fed to a clarifying station 98. This could be the same station as earlier described, or a separate station, and comprises clarifying means such as settling basins, dissolved air flotation and the like. Solids 100 from the clarifying station 98 are returned to the manure storage tank 58, and water 94 from the clarifying station is sent, along with water 62 from the other clarifying station 66 to an activated sludge aeration system 102. In this aeration system, the water, containing dissolved organic pollutants as well as nitrogen and phosphorous, is mixed with bacteria and oxygen in a reactor or aeration basin. The bacteria convert the dissolved organic pollutants as well as the nitrogen and phosphorous into more bacteria, carbon dioxide, nitrogen gas, water, and other products. Oxygen consumption by the activated sludge aeration system on the order of 20 tons per day is anticipated. The carbon dioxide and nitrogen gas are vented to the atmosphere, the water is filtered by a filter unit 104 to remove the bacteria, and the discharge 106 complies with the highest standards of applicable environmental regulations and may be released into the environment. A portion of the bacteria 108 is sent to another drying station 110 where it may be combined with wet biomass 112 from outside sources such as may be delivered by trucks 114 from municipal waste water treatment facilities. The bacteria 108, 112 are dried and yield a Class A biosolid 116. Capacities on the order of 80 wet tons per day of dewatered biosolids are expected to be processed by the facility yielding 30 cubic yards of final dried material daily.

As evidenced by the high rate of oxygen consumption of the activated sludge aeration system, the waste water from CAFOs is extremely high strength. Two measures of this strength are the biological oxygen demand (BOD) and the Total Keldjhal Nitrogen (TKN). The biological oxygen demand required to reduce the pollutants from CAFO waste water may exceed of 10,000 mg/l, more than an order of magnitude greater than the 225 mg/l BOD of effluent from a typical municipal waste water treatment facility. Similar relationships are also evidenced by a comparison between the Total Keldjhal Nitrogen (TKN) of the waste water from CAFOs and municipal waste water. CAFOs yield waste water having 2,900 mg/l TKN whereas municipal waste water tops out at about 25 mg/l TKN. In view of this difference in strength between the waste water streams of CAFOs as compared with municipal waste water, the art applies different unique solutions to both problems, which may reasonably be seen as divergent arts.

Treatment of CAFO animal waste by the method and facility disclosed herein provides a means for efficiently and effectively reducing the level of pollutants released into the environment in response to the ever increasing demands imposed by government regulation, economic concerns and population growth.

The invention claimed is:

1. A method of treating manure from a plurality of concentrated animal feed operations, said method comprising:
   receiving said manure at a central location;
   digesting said manure and thereby producing combustible gases, solid matter and water containing dissolved organic pollutants;
   drawing off said combustible gases;
   separating a portion of said water from said solid matter; and
   converting said dissolved organic pollutants into bacteria, carbon dioxide and additional water by treating said portion of said water using an activated sludge aeration system.

2. A method according to claim 1, further comprising treating said manure with ultrasonic sound waves prior to said digesting, said sound waves disrupting cell walls of bacteria in said manure.

3. A method according to claim 1, further comprising separating a second portion of said water containing dissolved organic pollutants from said manure prior to said digesting.

4. A method according to claim 3, further comprising converting said dissolved organic pollutants into bacteria, carbon dioxide and additional water by treating said second portion of said water using said activated sludge aeration system.

5. A method according to claim 3, further comprising treating said manure with ultrasonic sound waves prior to said digesting, said sound waves disrupting cell walls of bacteria in said manure.

6. A method according to claim 1, further comprising drying said solid matter.

7. A method according to claim 1, further comprising filtering said portion of said water thereby removing said bacteria therefrom.

8. A method according to claim 7, further comprising drying said bacteria.

9. A method according to claim 1, further comprising receiving bacteria laden solid matter from a plurality of waste water treatment facilities and drying said bacteria laden solid matter.

10. A method according to claim 1, further comprising using said combustible gases to generate energy.

11. A method according to claim 1, further comprising:
    clarifying said portion of said water by removing solid matter suspended therein; and
    again digesting said solid matter.

* * * * *